US010035621B2

(12) United States Patent
Warner

(10) Patent No.: US 10,035,621 B2
(45) Date of Patent: Jul. 31, 2018

(54) MULTI-BARRIER BOTTLES HAVING TABBED PREFORMS, AND METHODS OF FORMING THE SAME

(71) Applicant: Double Double D, LLC, Waynesville, OH (US)

(72) Inventor: Jim F. Warner, Chicago, IL (US)

(73) Assignee: Double Double D, LLC, Waynesville, OH (US)

(*) Notice: Subject to any disclaimer, the term of this patent is extended or adjusted under 35 U.S.C. 154(b) by 21 days.

(21) Appl. No.: 15/094,539

(22) Filed: Apr. 8, 2016

(65) Prior Publication Data

US 2016/0297556 A1    Oct. 13, 2016

Related U.S. Application Data

(60) Provisional application No. 62/144,550, filed on Apr. 8, 2015.

(51) Int. Cl.
*B65D 23/00* (2006.01)
*B65D 1/02* (2006.01)
(Continued)

(52) U.S. Cl.
CPC .............. *B65D 1/0215* (2013.01); *B29C 49/24* (2013.01); *B29B 2911/1402* (2013.01); *B29B 2911/1404* (2013.01); *B29B 2911/14026* (2013.01); *B29B 2911/14033* (2013.01); *B29B 2911/14546* (2013.01); *B29C 2049/2404* (2013.01); *B29C 2049/2443* (2013.01);
(Continued)

(58) Field of Classification Search
CPC ....... B29B 2911/14113; Y10S 229/933; B29K 2105/253; B29C 66/545; B29C 2049/2026; B65D 83/0055; B65D 1/0215; B65D 77/06
USPC ....................................................... 215/12.2
See application file for complete search history.

(56) References Cited

U.S. PATENT DOCUMENTS 2,090,699 A    8/1937  Plunkett
2,590,221 A    4/1947  Stevens
(Continued)

FOREIGN PATENT DOCUMENTS

EP    0210428 A2    2/1987
EP     538176 A1    4/1993
(Continued)

OTHER PUBLICATIONS

International Search Report and the Written Opinion of the International Search Authority, or the Declaration from PCT/US2009/068766 dated Mar. 5, 2010, 11 pages.
(Continued)

*Primary Examiner* — Shawn M Braden
(74) *Attorney, Agent, or Firm* — Dinsmore & Shohl, LLP

(57) ABSTRACT

Multi-barrier bottles having tabbed preforms, as well as methods of forming the same are disclosed. A tabbed preform includes an elongate body extending into a cavity of a first barrier, where the cavity is defined by at least one piece having a recess therein. The tabbed preform further includes at least one preform extension piece extending from the elongate body at a predetermined distance from a top surface of the elongate body. The at least one preform extension piece is sized and shaped to correspond to a size and a shape of the recess.

19 Claims, 5 Drawing Sheets

(51) Int. Cl.
  *B29C 49/24* (2006.01)
  *B29L 31/00* (2006.01)
  *B29C 49/42* (2006.01)
(52) U.S. Cl.
  CPC .................. *B29C 2049/4226* (2013.01);
    *B29C 2791/001* (2013.01); *B29K 2995/0067*
    (2013.01); *B29L 2031/7158* (2013.01)

(56) References Cited

U.S. PATENT DOCUMENTS

| | | | |
|---|---|---|---|
| 2,460,820 A | 2/1949 | Hagopian | |
| 3,119,543 A | 1/1964 | Walker | |
| 3,176,879 A | 4/1965 | Mojonnier | |
| 3,318,748 A | 5/1967 | Hurst | |
| 3,390,816 A | 7/1968 | Mojonnier | |
| 3,510,054 A | 5/1970 | Sanni et al. | |
| 3,616,197 A | 10/1971 | Amberg et al. | |
| 3,658,615 A | 4/1972 | Amberg | |
| 3,898,310 A | 8/1975 | Schiemann | |
| 3,912,080 A | 10/1975 | Winberg | |
| 3,947,617 A | 3/1976 | Gerek et al. | |
| 3,957,558 A | 5/1976 | Lee et al. | |
| 4,078,715 A | 3/1978 | Larsson et al. | |
| 4,256,231 A | 3/1981 | Cioc et al. | |
| 4,286,636 A * | 9/1981 | Credle | B65D 83/0055 138/115 |
| 4,298,045 A | 11/1981 | Weiler et al. | |
| 4,460,348 A | 7/1984 | Lioka et al. | |
| 4,483,464 A | 11/1984 | Nomura | |
| 4,709,825 A | 12/1987 | Mumford | |
| 4,723,677 A | 2/1988 | Nagel, Jr. | |
| 4,732,299 A | 3/1988 | Hoyt | |
| 5,009,939 A | 4/1991 | Goldberg | |
| 5,108,382 A | 4/1992 | Wright et al. | |
| 5,122,399 A | 6/1992 | Farrell et al. | |
| 5,169,470 A | 12/1992 | Goldberg | |
| 5,191,988 A | 3/1993 | Reil et al. | |
| 5,220,129 A | 6/1993 | Nishio et al. | |
| 5,232,107 A | 8/1993 | Krall et al. | |
| 5,474,212 A * | 12/1995 | Ichikawa | B05B 11/0043 222/105 |
| 5,613,779 A | 3/1997 | Niwa | |
| 5,679,109 A | 10/1997 | Gics | |
| 5,688,570 A * | 11/1997 | Ruttinger, Sr. | B29C 33/42 215/12.2 |
| D397,292 S | 8/1998 | Tabaroni et al. | |
| 5,866,172 A | 2/1999 | Parks | |
| 5,968,616 A | 10/1999 | Kakemura et al. | |
| 6,142,344 A * | 11/2000 | Kai | B65D 75/5883 222/105 |
| 6,422,753 B1 | 7/2002 | Thomas | |
| 6,626,308 B2 | 9/2003 | Weiler | |
| 6,685,789 B1 | 2/2004 | Wissing | |
| 7,048,132 B2 | 5/2006 | Yamanaka et al. | |
| 7,832,595 B2 * | 11/2010 | Lickstein | A47K 5/1202 222/325 |
| 8,096,448 B2 | 1/2012 | Keller et al. | |
| 9,211,993 B2 * | 12/2015 | Tom | B67D 7/025 |
| 9,296,544 B2 * | 3/2016 | Miyairi | B65D 1/0215 |
| 9,511,892 B2 * | 12/2016 | Hosokoshiyama | B32B 27/32 |
| 2002/0132069 A1 | 9/2002 | Kose et al. | |
| 2007/0102320 A1 | 5/2007 | Van Der Krogt et al. | |
| 2007/0259139 A1 | 11/2007 | Furneaux et al. | |
| 2007/0269622 A1 | 11/2007 | Chuprevich et al. | |
| 2008/0041810 A1 | 2/2008 | Itoh et al. | |
| 2008/0065210 A1 | 3/2008 | McKay | |
| 2010/0044267 A1 | 2/2010 | Tolibas-Spurlock et al. | |
| 2010/0054334 A1 | 3/2010 | Yoo et al. | |
| 2010/0084361 A1 | 4/2010 | Dayton et al. | |
| 2010/0200591 A1 | 8/2010 | Myerscough | |
| 2010/0252617 A1 | 10/2010 | Dayton et al. | |
| 2011/0089173 A1 | 4/2011 | Patel et al. | |
| 2011/0180592 A1 | 7/2011 | Green et al. | |
| 2011/0220652 A1 | 9/2011 | Corbett et al. | |
| 2011/0290798 A1 * | 12/2011 | Corbett | B65D 11/04 220/62.12 |
| 2012/0024897 A1 | 2/2012 | Corbett et al. | |
| 2012/0097632 A1 | 4/2012 | West et al. | |
| 2012/0145710 A1 | 6/2012 | Corbett et al. | |
| 2014/0252032 A1 | 9/2014 | Corbett et al. | |
| 2015/0034588 A1 | 2/2015 | Corbett et al. | |
| 2015/0298895 A1 | 10/2015 | Corbett et al. | |
| 2015/0308050 A1 | 10/2015 | Corbett et al. | |
| 2015/0314916 A1 | 11/2015 | Corbett et al. | |

FOREIGN PATENT DOCUMENTS

| | | |
|---|---|---|
| EP | 0692428 A1 | 5/1995 |
| EP | 0768974 A1 | 4/1997 |
| FR | 2722447 A1 | 1/1996 |
| JP | 2005313986 A | 11/2005 |
| WO | 9601212 A2 | 1/1996 |
| WO | 9614254 A1 | 5/1996 |
| WO | 9748619 A1 | 12/1997 |
| WO | 9810993 A1 | 3/1998 |
| WO | 2010054334 A2 | 5/2010 |
| WO | 2010071815 A1 | 6/2010 |

OTHER PUBLICATIONS

Patent Examination Report No. 1, Australian Appl. No. 2009327426 dated Aug. 10, 2012, 6 pages.
Canadian Office Action, Canadian Appl. No. 2,747,515 dated Nov. 6, 2012, 11 pages.
Extended European Search Report, application No. 09833840.3 dated Jun. 12, 2012.
Dave Sattler "Find a Brand for this Paper Water Bottle" Ecopreneurist, Dec. 9, 2008 (Dec. 9, 2008), XP002674688, Retrieved from the Internet: URL: http://ecopreneurist.com/2008/12/09/find-aa-brand-for-this-paper-water-bottle/ (retrieved on Apr. 20, 2012).
Office action dated Dec. 18, 2009, Application No. 2011147470/12(071158), PCT Application No. PCT/US2009/068766, 7 pages.
Miller et al., The Consumer Trust Crisis: How package structure can help build brand confidence, Brandpackaging Magazine, pp. 13, 14, 16, Apr. 2005.
Inventorspot.com, Forget Plastic! The Brilliant Invention of the 360 Paper Water Bottle [online], Copyright 2006-2020 [retrieved on Feb. 9, 2010], retrieved from the internet: URL: http:/inventorspot.com/articles/forget_plastic_brilliant_invention_360_paper_water_bottle_20997.

* cited by examiner

MULTI-BARRIER BOTTLES HAVING TABBED PREFORMS, AND METHODS OF FORMING THE SAME

CROSS-REFERENCE TO RELATED APPLICATION

The present application claims priority to U.S. Provisional Patent Application Ser. No. 62/144,550, filed Apr. 8, 2015 and entitled "Bottle Preform," which is incorporated by reference herein in its entirety.

TECHNICAL FIELD

Embodiments described herein generally relate to a multi-barrier bottle formed from a bottle preform and, more specifically, to a bottle preform with at least one preform extension piece.

BACKGROUND

Bottle preforms may be produced as an inner barrier of a bottle that comprises a polymer or other similar material that is blow molded, extruded, or otherwise expanded to a predetermined final shape, thereby resulting in bottles that are used for many different purposes, such as for containing beverages, culinary ingredients, cleaning products, beauty products, automotive products, and/or other fluids. While current methods of bottle production may utilize interior and exterior barriers, many of these current processes are inefficient in terms of material usage and result in misalignment between the barriers, causes the bottle to be structurally insecure. Accordingly, there exists a need in the industry for more efficient material usage and ensuring appropriate alignment between barriers.

SUMMARY

In one embodiment, a tabbed preform includes an elongate body extending into a cavity of a first barrier, where the cavity is defined by at least one piece having a recess therein. The tabbed preform further includes at least one preform extension piece extending from the elongate body at a predetermined distance from a top surface of the elongate body. The at least one preform extension piece is sized and shaped to correspond to a size and a shape of the recess.

In another embodiment, a multi-barrier bottle includes a first barrier having a first piece and a second piece that define a cavity within the first barrier and a second barrier formed from a tabbed preform. The first piece includes a first recess and the second piece comprises a second recess. The tabbed preform includes an elongate body extending into the cavity within the first barrier and first and second preform extension pieces extending from the elongate body at a predetermined distance from a top surface of the elongate body. The first and second preform extension pieces are received in the first recess and the second recess of the first barrier.

In yet another embodiment, a multi-barrier bottle includes a first barrier having a first piece and a second piece that define a cavity within the first barrier, and a second barrier formed from a blow molded tabbed preform. The first piece includes a first recess and the second piece includes a second recess. The blow molded tabbed preform includes an elongate body extending into the cavity within the first barrier, first and second preform extension pieces extending from the elongate body at a predetermined distance from a top surface of the elongate body, where the first and second preform extension pieces are received in the first recess and the second recess of the first barrier, and a plurality of beads extending from the elongate body around a circumference of the elongate body, where the plurality of beads are located between the first and second preform extension pieces and the top surface of the elongate body and maintain a positioning of the tabbed preform with respect to the first barrier such that the first barrier is in contact with the at least one bead.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Bottle preforms are generally used as predecessor materials for bottles, particularly plastic bottles. That is, a bottle preform may be configured as an amorphous structure that is produced from a material, such as a resin or the like, by melting the resin in an extruder and injection molding the molten resin into a preform shape. Such a preform usually includes an outside surface area that is generally smaller than the outside surface of the bottle that results therefrom. To make a bottle from the preform, the preform may be heated to an orientation temperature such as, for example, about 30° C. above the glass transition temperature. The heated preform is then placed into a bottle mold and formed into a bottle by stretching the preform and inflating it with high pressure air.

The resin materials that may be used for preform production include polyester resins, such as polyethylene terephthalate (PET) and its copolyesters. However, other polymer resins that may be used for preforms are generally understood. Such resins may be considered harmful to the environment, as they are oftentimes not biodegradable. As such, it may be desirable to minimize use of the resin material to reduce the amount of material that may potentially end up in a landfill while at the same time avoiding degradation of the quality and purpose of the resultant bottle.

Embodiments disclosed herein include a bottle preform that decreases the amount of material used to form the bottle preform. In addition, the bottle preform provides an orientation capability during production to ensure the preform is appropriately aligned with an outer barrier layer. That is, the quantity of polymer per bottle can be reduced by using the preform described herein to impart orientation in the resultant bottle sidewall, thereby improving resultant bottle strength.

While the preform described herein relates generally to a preform used in forming a bottle, the present disclosure is not limited to such. For example, the preform may be used to form any of an article, a container, and/or the like. As such, it should be understood that a "bottle preform" refers to a preform in the general sense and not solely a preform that is used to form a bottle.

Similarly, embodiments described herein may be configured as a multi-barrier container. Embodiments that utilize a multi-barrier configuration may include a plurality of layers of barrier material, including an outer barrier layer and an inner barrier layer formed from the preform. A barrier material may include any material that is used to form a gas barrier from the gases that are used when forming a bottle from the preform. In addition, the barrier material may also include any material that is used to form a gas barrier for the eventual contents of the resulting bottle (e.g., a bottle filled with carbonated drinks contains carbon dioxide). Other embodiments are also contemplated.

Figure 1A:
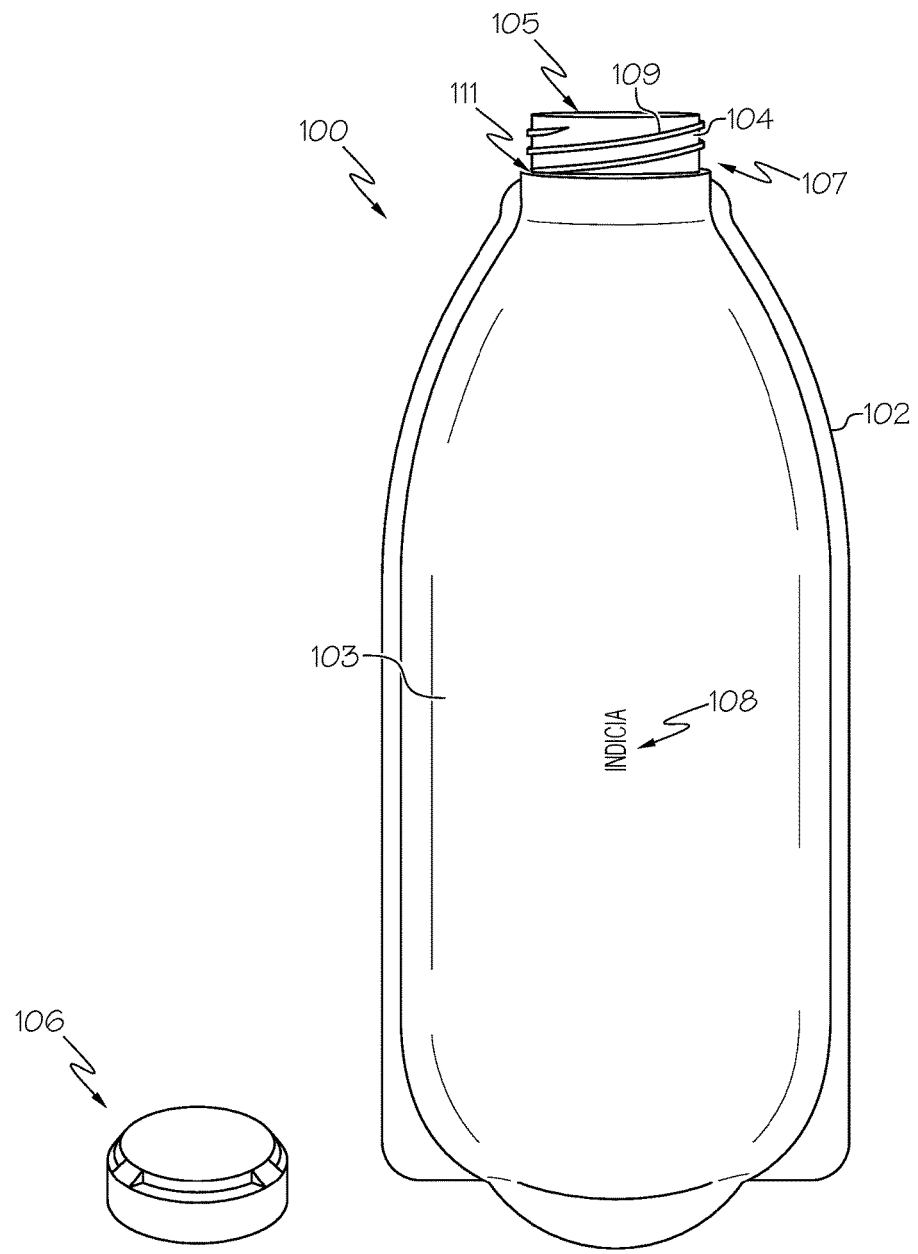
FIG. 1A depicts a side view of a multi-barrier bottle with a cap removed according to one or more embodiments shown and described herein.

Referring now to the drawings, FIG. 1A depicts a multi-barrier bottle 100, according to embodiments described herein. As illustrated, the multi-barrier bottle 100 includes at least an exterior barrier 102 (e.g., a first barrier) and an interior barrier 104 (e.g., a second barrier). The exterior barrier 102 may include one or more walls 103 and may be coupled to the interior barrier 104 to define a cavity 105. As such, the exterior barrier 102 may generally surround at least a portion of the interior barrier 104. In some embodiments, the exterior barrier 102 may surround most the interior barrier 104. That is, the entirety of the interior barrier 104 except for a top portion 107 is surrounded by the exterior barrier 102. Thus, in embodiments where the exterior barrier 102 is constructed of an opaque material, the interior barrier 104, other than the top portion 107 thereof may not be visible.

In some embodiments, the exterior barrier 102 may be created from a single piece of material. That is, the exterior barrier 102 may be particularly formed as a one piece component. For example, the exterior barrier 102 may be formed by molding (e.g., injection molding, compression molding, or the like), extruding (e.g., extrusion molding), sculpting, blowing, or the like into a single piece unit. As an example, the single piece of the exterior barrier may be wrapped and seamed to create an enclosure defined by the exterior barrier 102. In other embodiments, the exterior barrier 102 may be created by joining a plurality of pieces together at a plurality of seams. For example, the exterior barrier 102 may be formed by fusing a first piece to a second piece, as will be described herein.

In some embodiments, the exterior barrier 102 may be sized to define a predetermined interior volume for containing the fluid (e.g., a volume of the cavity 105). For example, the exterior barrier 102 may define an interior volume of about 1 milliliter (ml), about 10 ml, about 50 ml, about 100 ml, about 250 ml about 500 ml, about 750 ml, about 1 liter, about 1.5 liter, about 2 liter, about 2.5 liter, about 5 liter, about 10 liter, etc. or any value or range between any two of these values (including endpoints). However, it should be understood that the volumes listed herein are merely illustrative and that the present disclosure is not limited to such.

The exterior barrier 102 may contain indicia 108 thereon or incorporated therewith. For example, the indicia 108 may be located on one or more of the walls 103 of the exterior barrier 102. The indicia 108 may be printed directly on the exterior barrier 102, affixed to the exterior barrier 102, formed in a surface of the exterior barrier 102 (e.g., an embossed indicia), and/or the like.

In various embodiments, the exterior barrier 102 may be constructed of an ecologically friendly material. While not exclusively limited to such, an ecologically friendly material may be a biodegradable material, compostable material, recyclable material, etc. Illustrative ecologically friendly materials may include, but are not limited to, agricultural processing materials, such as forms of sugarcane (bagasse), bamboo, wheat straw, banana leaves, hay, grasses, cornstalks, recycled pulp, fiber materials, and/or the like. Other illustrative ecologically friendly materials may include, but are not limited to, post-consumer waste, such as newsprint, packaging, other forms of paper products, and/or the like that may or may not have been recycled and/or repurposed for a particular application as described herein. Yet other illustrative ecologically friendly materials may include, but are not limited to, composite materials, such as materials obtained from landfill and/or municipal reclaim centers, including architectural wood, building materials, manufacturing byproducts, and/or the like. It should be understood that one or more other ecologically friendly materials not specifically described herein may also be used without departing from the scope of the present disclosure.

The interior barrier 104 may be constructed of a polymer material or the like, particularly materials that are capable of being blow molded and/or extruded. In some embodiments, the interior barrier 104 may be a preform, and thus may be constructed of materials that are used for preforms, particularly bottle preforms. As described above, illustrative materials may include, but are not limited to, PET and its copolyesters. Other illustrative materials may include polyether block amides (e.g., PEBAX), nylons, polyurethanes, polyethylenes (e.g., high density polyethylenes (HDPE), ultra-high-molecular-weight polyethylenes (UHWPE), low density polyethylenes (LDPE), or any combination thereof), biaxially-oriented polyethylene terephthalates (e.g., mylar), and other polymers and thermoplastic polymers, fabrics, silicones such as silicone rubber, latex, glass, or other materials now known or later developed.

The interior barrier 104 may be particularly sized and/or shaped such that it can fit within a volume defined by an interior surface of the exterior barrier 102, such as through an opening 111 in the cavity 105. In embodiments where the interior barrier 104 is a preform, the size and shape may generally correspond to typical preform shapes and/or sizes prior to forming the bottle from the preform. Other sizes and/or shapes of the interior barrier 104 should generally be understood.

Figure 1B:
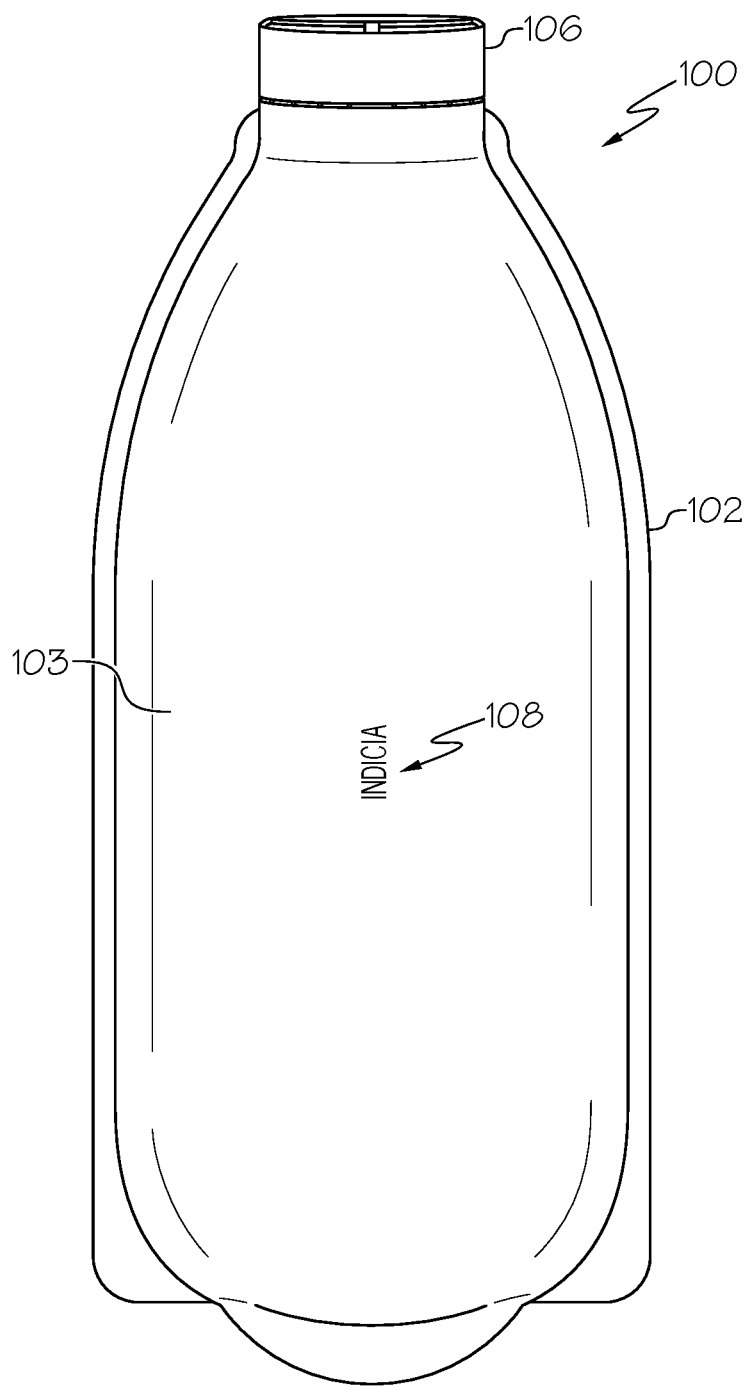
FIG. 1B depicts a side perspective view of a multi-barrier bottle with a cap according to one or more embodiments shown and described herein.

In various embodiments, the multi-barrier bottle 100 may also include a removable cap 106. The removable cap 106 may be attachable to at least a portion of the multi-barrier bottle 100 via one or more attachment members 109 located on at least a portion of the multi-barrier bottle 100 and/or the removable cap 106. For example, the removable cap 106 may contain one or more threads (not shown) that correspond to one or more threads that define the attachment members 109. As such, the removable cap 106 may be screwed onto the top portion 107 of the interior barrier 104 to secure the components together, as depicted in FIG. 1B.

The removable cap 106 is not limited by this disclosure in shape, size, composition, or securing mechanism. In some embodiments, the removable cap 106 may correspond in shape and size to the top portion 107 of the interior barrier 104 such that the removable cap 106 can be securely placed on the interior barrier 104. In some embodiments, the removable cap 106 may have various dimensional aspects that are generally recognized as being a standard shape and/or size. Similarly, some embodiments may be configured such that the removable cap 106 may be flexible and removed by deforming the flexible cap and/or performing other action to remove the removable cap 106 from the attachment members 109. Depending on the embodiment, the removable cap 106 may or may not be configured to reattach to the attachment members 109 once removed.

As illustrated in more detail in FIGS. 2 and 3A-3C, in embodiments where the interior barrier 104 is a preform, the preform may include one or more preform extension pieces 202 (or a plurality of preform extension pieces, such as a first preform extension piece and a second preform extension piece) that are aligned in a particular orientation. Accordingly, the exterior barrier 102 can be placed around the preform material, with the preform extension pieces 202 being aligned with the seams of the exterior barrier 102. Upon sealing the exterior barrier 102 around the preform material, the preform material may be blow molded to form the interior barrier 104. The multi-barrier bottle 100 may then be coupled with the removable cap 106 for sealing the bottle when in use.

Figure 2:
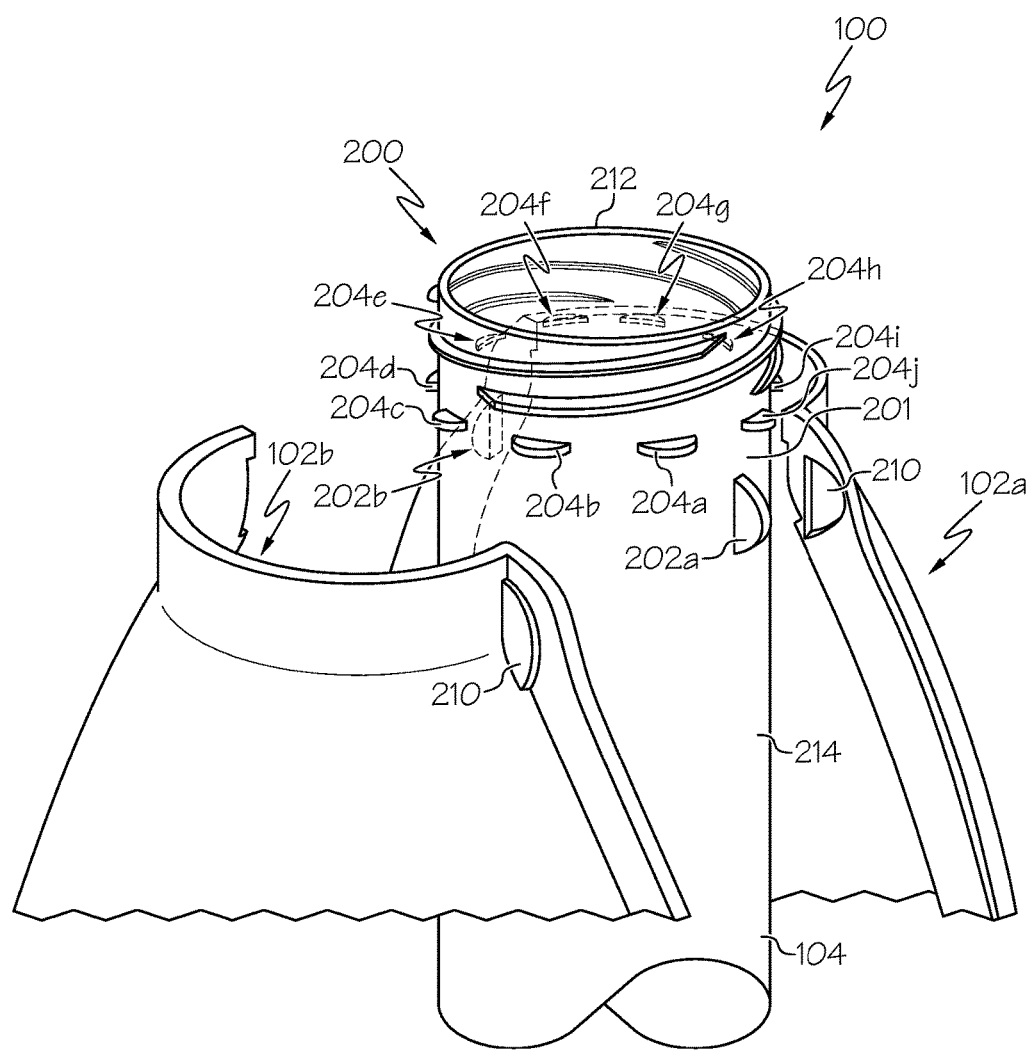
FIG. 2 depicts an exploded view of a top portion of a multi-barrier bottle having a tabbed preform according to one or more embodiments shown and described herein.

FIG. 2 depicts an exploded view of a portion of the multi-barrier bottle 100 having a tabbed preform 200, according to embodiments described herein. As illustrated, the multi-barrier bottle 100 may include the exterior barrier 102, which is constructed using a first piece 102a and a second piece 102b. Each of the first piece 102a and the second piece 102b may incorporate one or more recesses 210 therein. The recesses 210 may receive one or more components, as described in greater detail herein.

As illustrated in FIG. 2, the tabbed preform 200 may include an elongate body 214 extending into the cavity 105 of the exterior barrier 102 (FIG. 1) and one or more preform extension pieces 202a, 202b extending from the elongate body 214. The one or more preform extension pieces 202a, 202b may be collectively referred to as preform extension pieces 202 and generically as a preform extension piece 202. While FIG. 2 depicts two preform extension pieces 202 located on opposite sides of the elongate body 214 tabbed preform 200, the present disclosure is not limited to such. Depending on the embodiment, the tabbed preform 200 may have greater or fewer preform extension pieces 202. In some embodiments, the number of preform extension pieces 202 may correspond to a number of seams that are present between various pieces of the exterior barrier 102. For example, an exterior barrier 102 comprising two pieces may have two seams when joined together, thereby providing for two preform extension pieces 202. In another example, an exterior barrier 102 that includes three pieces may have three seams when joined together, thereby providing three preform extension pieces 202. In some embodiments each seam may correspond with more than one preform extension pieces 202.

The preform extension pieces 202 may be coupled to the tabbed preform 200 at various locations around the circumference of the elongate body 214 of the tabbed preform 200. For example, the preform extension pieces 202 may extend from an exterior wall 201 of the tabbed preform 200. In addition, the preform extension pieces 202 may be located at or near a top surface 212 of the tabbed preform 200. In some embodiments, the various preform extension pieces 202 may be substantially evenly spaced from one another around the circumference of the elongate body 214 of the tabbed preform 200. For example, as particularly shown in FIGS. 2 and 3B-3C, the preform extension pieces 202 may be located at about 180° from each other about the circumference of the tabbed preform 200 such that the extension pieces are on opposite sides of the tabbed preform 200. In some embodiments, the preform extension pieces 202 may be molded as an integral component of the tabbed preform 200. As such, the preform extension pieces 202 may be constructed of the same materials as for the tabbed preform 200.

The preform extension pieces 202 may be a particular shape and/or size to correspond to the shape and/or size of the recesses 210 in the exterior barrier 102. Thus, when the exterior barrier 102 is assembled around the tabbed preform 200, each of the preform extension pieces 202 may substantially fit within a corresponding recess 210. In some embodiments, the preform extension pieces 202 may all have substantially the same shape and/or size such that the they are agnostic to the corresponding recesses 210 (i.e., any preform extension piece 202 will fit in any recess 210). In other embodiments, the preform extension pieces 202 may have differing shapes and/or sizes such that each preform extension piece 202 specifically corresponds to a particular recess 210. As such, the tabbed preform 200 may be appropriately oriented with respect to the exterior barrier 102 and the first piece 102a and the second piece 102b, when brought together to form the exterior barrier 102, will secure the tabbed preform 200 to the exterior barrier 102.

In some embodiments, the preform extension pieces 202 may have a semicircular shape and may be arranged in a vertical orientation such that a flat edge of the semicircular shape contacts the exterior wall 201 of the preform extension piece 202. In addition, such a shape and vertical orientation corresponds to the shape and orientation of the recesses 210 in the exterior barrier 102. However, such a shape and vertical orientation is merely illustrative.

Also depicted in FIG. 2 is a plurality of beads 204a-204j, which may be collectively be referred to as beads 204 or generically as a bead 204. The beads 204 may span the circumference of the tabbed preform 200 at a predetermined distance from the top surface 212 of the tabbed preform 200. In some embodiments, the predetermined distance may be less than a distance between the top surface 212 and the preform extension pieces 202. Similar to the preform extension pieces 202, the plurality of beads 204 may extend from the exterior wall 201 of the tabbed preform 200. Also similar to the preform extension pieces 202, the plurality of beads 204 may be molded as an integral component of the tabbed preform 200, and thus composed of the same materials as the tabbed preform 200.

The plurality of beads 204 may generally provide an indicator of an upper limit for placement of the exterior barrier 102 on the tabbed preform 200. That is, the plurality of beads 204 may act as a stop mechanism that restricts the exterior barrier 102 from being placed above the plurality of beads 204 (such as between the plurality of beads 204 and the top surface 212 of the tabbed preform 200 and/or beyond the top surface 212 of the tabbed preform 200). As such, when the exterior barrier 102 is placed around the tabbed preform 200, the exterior barrier 102 may not extend beyond the location of the plurality of beads 204 because the extension of the plurality of beads 204 from the exterior wall 201 of the tabbed preform 200 results in a circumference that is too large to join the first piece 102a and the second piece 102b together. However, when the tabbed preform 200 is properly placed with respect to the exterior barrier 102, the first piece 102a and the second piece 102b may fit together to be joined around the tabbed preform 200.

FIG. 2 further depicts at least a portion of the plurality of beads 204 as being similar to the preform extension pieces 202 in shape. That is, each of the plurality of beads 204 may be generally semicircular in shape. While each of the preform extension pieces 202 are arranged in a vertical orientation with respect to the tabbed preform 200, the plurality of beads 204 are each arranged in a horizontal orientation with respect to the tabbed preform 200. However, the shape, size, and orientation of the plurality of beads 204 are merely illustrative, and the present disclosure is not limited solely to the shapes, sizes, and orientations described herein. As such, other shapes, sizes, and orientations of the plurality of beads 204 may be utilized.

While ten beads 204 are depicted in FIG. 2, the present disclosure is not limited to such. That is, in some embodiments, fewer than ten beads 204 or greater than ten beads 204 may be used without departing from the scope of the present disclosure. In some embodiments, a single bead 204 may extend around the circumference of the tabbed preform 200 as a lip or the like to achieve similar functionality.

Figure 3A:
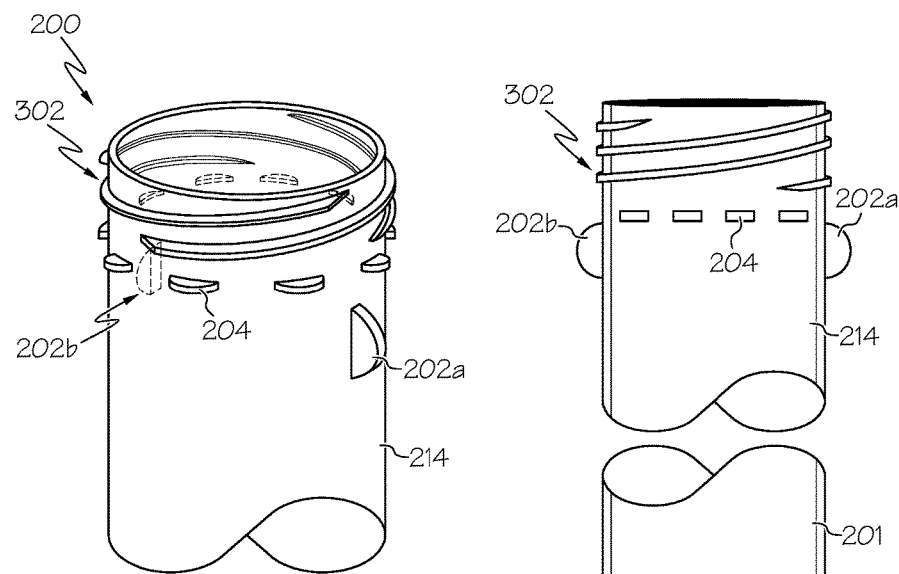
FIG. 3A depicts a detailed perspective view of a top portion of a tabbed preform according to one or more embodiments shown and described herein.
Figure 3B:
FIG. 3B depicts a detailed side view of a tabbed preform according to one or more embodiments shown and described herein.
Figure 3C:
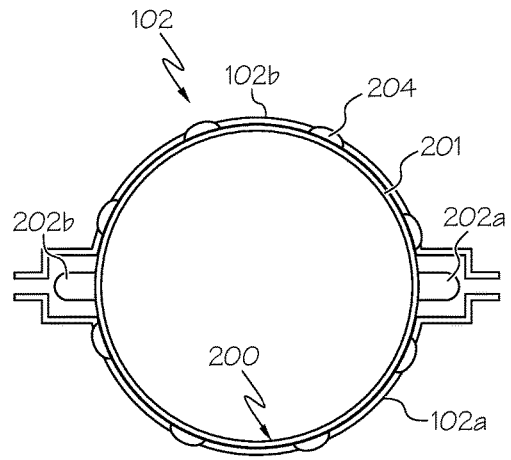
FIG. 3C depicts a top view of a tabbed preform according to one or more embodiments shown and described herein.

FIGS. 3A-3C depict more detailed views of the tabbed preform 200 according to various embodiments. As illustrated in FIG. 3A, the tabbed preform 200 may include the preform extension pieces 202a, 202b, as well as the beads 204a-204j. The tabbed preform 200 may also include a screw-top configuration 302 or other mechanism for receiving the removable cap 106 (FIGS. 1-2). That is, the screw-top configuration 302 may incorporate a plurality of threads that correspond to threads on an interior surface of the removable cap 106 (FIGS. 1-2) such that the removable cap 106 can be securely fastened to the tabbed preform 200.

As illustrated in FIG. 3B, the tabbed preform 200 may be designed with a low profile. That is, a cross-sectional thickness of the tabbed preform 200 may be less than that of a typical preform. Such a low profile may serve to reduce a gram weight of the tabbed preform 200 and utilize an efficient amount of polymer material. That is, the tabbed preform 200 may require a lesser amount of material than other preforms by decreasing a thickness of the exterior walls 201 of the tabbed preform 200. As such, the exterior walls 201 of the tabbed preform 200 generally have a thickness that is less than a thickness of other preforms. For example, a particular bottle preform may have a mass of about 25 grams. In contrast, the tabbed preform 200 may have generally the same dimensional aspects as the particular bottle preform (i.e., a similar height, width, and circumference), but may use less material, resulting in a wall thickness that is less than that of the particular bottle preform. As such, the mass of the tabbed preform 200 may be less than 25 grams.

FIG. 3C illustrates a top view of the multi-barrier bottle 100 (FIGS. 1-2), showing the preform extension pieces 202a, 202b being attached to the first piece 102a and the second piece 102b. As illustrated, the preform extension pieces 202a, 202b are received in the recesses such that the preform extension pieces 202a, 202b are be positioned to align with the perceived seal between the first piece 102a and the second piece 102b. When the seal is made, the preform extension pieces 202a, 202b may be part of that seal to secure the tabbed preform 200 to the exterior barrier 102.

As such, the preform extension pieces 202 may be configured to be rigid during the sealing process or could be configured to deform to further act as a sealing mechanism between the first piece 102a and the second piece 102b. For example, a heat treatment that is used to seal the perceived seams between the first piece 102a and the second piece 102b may cause the preform extension pieces 202 to melt to fuse the tabbed preform 200 to the exterior barrier 102.

Figure 4:
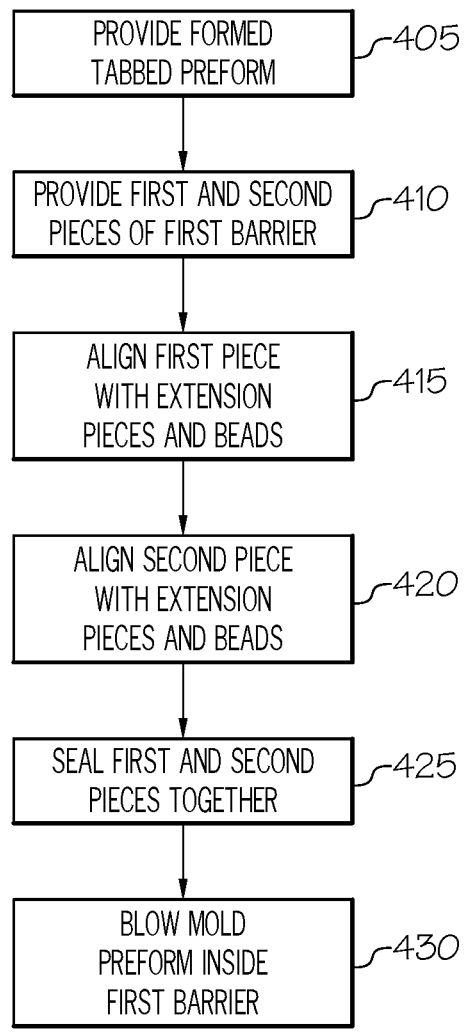
FIG. 4 depicts a flow diagram of a process for forming a multi-barrier bottle.

FIG. 4 depicts a flow diagram of an illustrative method of forming the multi-barrier bottle 100. Referring also to FIGS. 1-3C, the method may include providing the tabbed preform 200 at step 405. Providing the tabbed preform 200 may also include forming the tabbed preform 200 with the preform extension pieces 202, the beads 204, and/or the screw-top configuration 302, as described in greater detail herein. In addition, providing the tabbed preform 200 may also include forming the tabbed preform 200 with a smaller amount of material than a generally recognized preform, as also described in greater detail herein.

At step 410, the method may include providing the various pieces of the exterior barrier 102. For example, according to the embodiments described herein, step 410 may include providing the first piece 102a and the second piece 102b. In other embodiments, step 410 may include providing three or more pieces.

At steps 415 and 420, the first piece 102a and the second piece 102b of the exterior barrier 102 may be aligned with the tabbed preform 200. That is, the recess(es) 210 in the first piece 102a and/or the second piece 102b may be aligned with the corresponding preform extension pieces 202. In addition, the first piece 102a and the second piece 102b may be appropriately aligned with the beads 204. For example, the first piece 102a and the second piece 102b may be placed such that the beads 204 are located between the pieces 102 and the top surface 212 of the tabbed preform 200. In addition, some embodiments may be configured such that the pieces 102 may contact the beads 204.

At step 425, the first piece 102a and the second piece 102b may be sealed together around the tabbed preform 200. In some embodiments, the first piece 102a may be sealed to the second piece 102b via heating, application of an adhesive, and/or the like. In some embodiments, sealing the first piece 102a to the second piece 102b may cause the preform extension pieces 202 to adhere to the exterior barrier 102, thereby joining the exterior barrier 102 with the tabbed preform 200.

At step 430, the tabbed preform 200 may be formed into the interior barrier 104 inside the exterior barrier 102, thereby forming the multi-barrier bottle 100. While step 430 describes blow molding the tabbed preform 200, it should be understood that the present disclosure is not limited to such. That is, in some embodiments, other processes of forming the interior barrier 104 may be used, such as extruding the tabbed preform 200 or the like.

As illustrated above, various embodiments of multi-barrier container having a tabbed preform are disclosed. These embodiments may allow for an efficient use of materials, as well as allowing for the tabbed preform to be accurately oriented with respect to the first (e.g. outer) barrier in forming the bottle, thereby avoiding instances where malformation may occur because of a misalignment between the tabbed preform and the first barrier. While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A tabbed preform comprising:
   an elongate body extending into a cavity of a first barrier, wherein the cavity is defined by at least one piece having a plurality of recesses therein;
   at least one bead extending from the elongate body, the at least one bead maintaining a positioning of the tabbed preform with respect to the first barrier when the elongate body is coupled to the first barrier; and
   a plurality of preform extension pieces extending from the elongate body at a predetermined distance from a top surface of the elongate body, wherein:
      each one of the plurality of preform extension pieces is sized and shaped to correspond to a size and a shape of a corresponding one of the plurality of recesses in the first barrier, and
      one of the plurality of preform extension pieces is spaced about 180° from another one of the plurality of preform extension pieces about a circumference of the elongate body.

2. The tabbed preform of claim 1, wherein the at least one bead is located between the at least one preform extension piece and the top surface of the elongate body.

3. The tabbed preform of claim 1, wherein the at least one bead provides an indicator of an upper limit for placement of the first barrier with respect to the tabbed preform.

4. The tabbed preform of claim 1, wherein the tabbed preform is formed from at least one of the following: polyethylene terephthalate, a polyether block amide, nylon, polyurethane, polyethylene, biaxially-oriented polyethylene terephthalate, a fabric, and silicone.

5. The tabbed preform of claim 1, wherein:
   the at least one piece comprises a first piece and a second piece; and
   at least one of the plurality of preform extension pieces is aligned with a seam between the first piece and the second piece.

6. The tabbed preform of claim 1, wherein the plurality of preform extension pieces are an integral component of the tabbed preform.

7. The tabbed preform of claim 1, wherein the at least one of the plurality of preform extension pieces is rigid.

8. The tabbed preform of claim 1, wherein the at least one of the plurality of preform extension pieces is deformable.

9. The tabbed preform of claim 1, wherein the tabbed preform has a mass of less than 25 grams.

10. A multi-barrier bottle comprising:
    a first barrier comprising a first piece that is shaped to define a cavity, wherein the first piece comprises a plurality of recesses; and
    a second barrier formed from a tabbed preform, the tabbed preform comprising:
       an elongate body extending into the cavity within the first barrier;
       at least one bead extending from the elongate body around a circumference of the elongate body, the at least one bead maintaining a positioning of the tabbed preform with respect to the first barrier; and
       a plurality of preform extension pieces extending from the elongate body at a predetermined distance from a top surface of the elongate body, wherein each one of the plurality of preform extension pieces is received in a corresponding one of the plurality of recesses of the first barrier.

11. The multi-barrier bottle of claim 10, wherein the at least one bead is located between the first preform extension piece and the top surface of the elongate body.

12. The multi-barrier bottle of claim 10, wherein the first barrier comprises a second piece that comprises a second plurality of recesses, wherein each one of the second plurality of recesses corresponds to one of the plurality of preform extension pieces such that the one of the plurality of preform extension pieces is received in a corresponding recess of the second plurality of recesses.

13. The multi-barrier bottle of claim 10, wherein the tabbed preform is formed from at least one of the following: polyethylene terephthalate, a polyether block amide, nylon, polyurethane, polyethylene, biaxially-oriented polyethylene terephthalate, a fabric, and silicone.

14. The multi-barrier bottle of claim 10, wherein the first barrier is constructed of an ecologically friendly material selected from one or more of sugarcane, (bagasse), bamboo, wheat straw, banana leaves, hay, grass, cornstalk, recycled pulp, a fiber material, post-consumer newsprint, post-consumer packaging, reclaimed architectural wood, reclaimed building materials, and reclaimed manufacturing byproducts.

15. The multi-barrier bottle of claim 10, wherein one of the plurality of preform extension pieces is spaced about 180° from another one of the plurality of preform extension pieces about a circumference of the elongate body.

16. The multi-barrier bottle of claim 10, wherein the first preform extension piece is deformable within the first recess such that, when the first preform extension piece is deformed within the recess, the first preform extension piece fuses the first barrier to the second barrier.

17. A multi-barrier bottle comprising:
    a first barrier comprising a first piece and a second piece that are shaped to define a cavity, wherein the first piece comprises a first recess and the second piece comprises a second recess; and
    a second barrier formed from a blow molded tabbed preform, the blow molded tabbed preform comprising:
       a tabbed preform with an elongate body extending into the cavity within the first barrier;
       first and second preform extension pieces extending from the elongate body at a predetermined distance from a top surface of the elongate body, wherein:
          the first and second preform extension pieces are received in the first recess and the second recess of the first barrier, and
          the first and second preform extension pieces are spaced about 180° from one another about a circumference of the elongate body;
       a plurality of beads extending from the elongate body around the circumference of the elongate body, wherein the plurality of beads are located between the first and second preform extension pieces and the top surface of the elongate body and maintain a positioning of the tabbed preform with respect to the first barrier such that the first barrier is in contact with at least one of the plurality of beads; and
       at least one of the plurality of beads extending from the elongate body around the circumference of the elongate body, wherein at least one of the plurality of beads maintains a positioning of the tabbed preform with respect to the first barrier.

18. The multi-barrier bottle of claim 10, wherein the elongate body of the second barrier comprises a top portion having a plurality of threads that correspond to a plurality of interior threads on a removable cap such that the top portion receives the removable cap via a mating of the plurality of threads with the plurality of interior threads.

19. The multi-barrier bottle of claim 17, wherein the tabbed preform is formed from at least one of the following: polyethylene terephthalate, a polyether block amide, nylon, polyurethane, polyethylene, biaxially-oriented polyethylene terephthalate, a fabric, and silicone.

* * * * *